Figure 8:
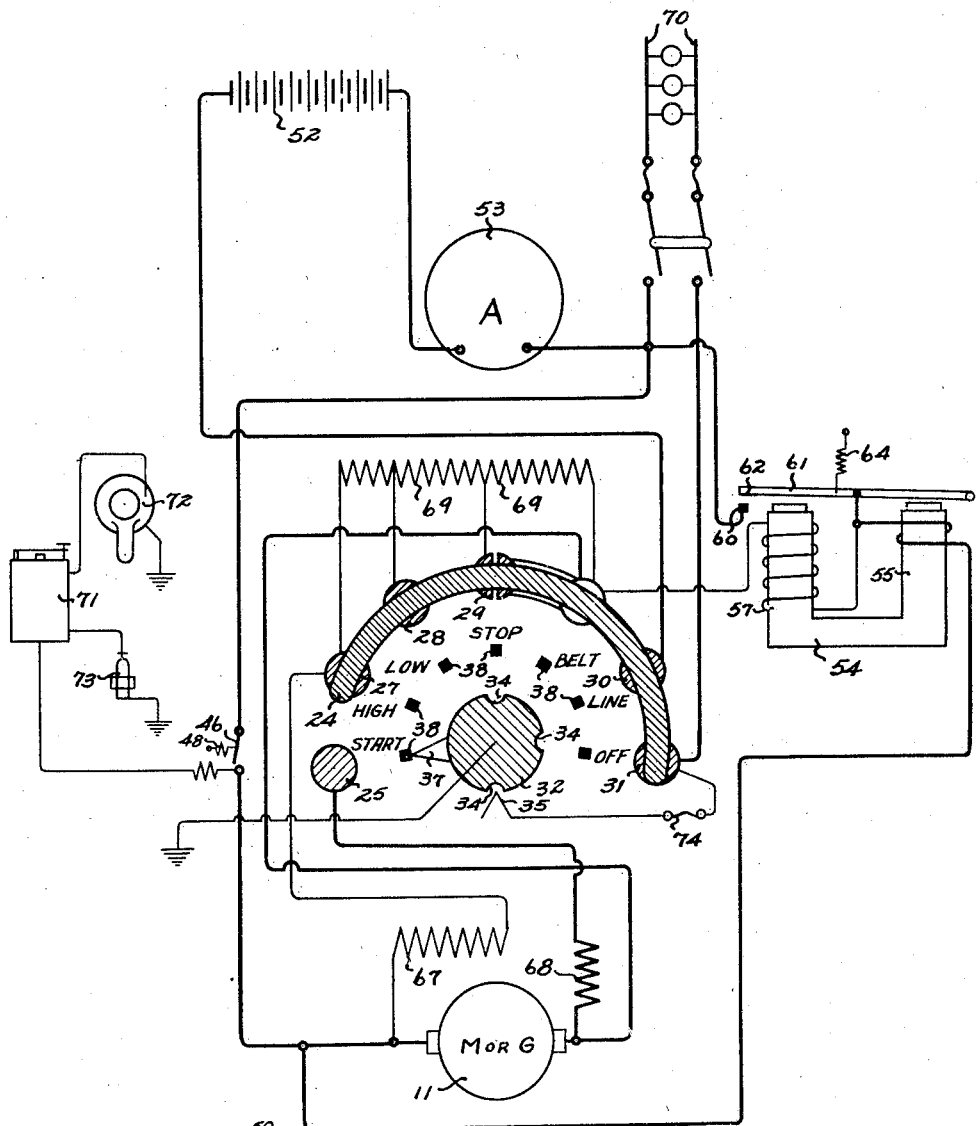

March 7, 1933.　　　W. H. HARSTICK　　　1,900,058
POWER PLANT
Filed May 15, 1930　　　2 Sheets-Sheet 1

INVENTOR
WILLIAM H. HARSTICK
BY
ATTORNEY

March 7, 1933. W. H. HARSTICK 1,900,058

POWER PLANT

Filed May 15, 1930 2 Sheets-Sheet 2

INVENTOR
WILLIAM H. HARSTICK
BY
Roy M. Eilers
ATTORNEY

Patented Mar. 7, 1933

1,900,058

UNITED STATES PATENT OFFICE

WILLIAM H. HARSTICK, OF BELOIT, WISCONSIN, ASSIGNOR TO FAIRBANKS, MORSE & CO., OF CHICAGO, ILLINOIS, A CORPORATION OF ILLINOIS

POWER PLANT

Application filed May 15, 1930. Serial No. 452,660.

This invention relates to improvements in power plants comprising dynamo machines driven by internal combustion engines, and more particularly to means for controlling the electric systems of power plants of the class described.

An object of the present invention is to provide means whereby a single control effects all necessary starting adjustments, following the closing of a starting switch.

A further object is to provide an improved reverse current cut-out in assemblies where the engine operates a generator for charging secondary batteries, the reverse current cut-out or relay operating to open a charging circuit upon reversal of the current in the system.

A further object is an improved combination of switching means and reverse current relay, with means for mechanically locking the relay in the closed position, corresponding to certain positions of the switching means, and independently of the electrical effects.

In existing types of power plants, where the engine is used with dynamo machines in connection with secondary batteries, it is customary to reverse the direction of current, to utilize the generator as a motor to start or crank the engine. In the present device, a single manual control accomplishes all necessary starting adjustments by movement of a lever provided for this purpose, and which is operated following the closing of a starting switch. As soon as the engine operates under its own power, the reverse current relay establishes the necessary circuit relations for ignition purposes and subsequent reversal of current in the system, except for starting purposes, opens the relay to break the circuit to avoid unintended discharge of the secondary batteries. This occurs whenever the plant may stop, say for lack of fuel, while the batteries are being charged. The advantages thus derived from the present unit control of an entire engine and dynamo assembly, will be apparent especially in the cases of small units in the hands of inexperienced operators. The preferred device has a minimum number of moving parts and wearing points and results in a neat, compact and practically trouble-proof assembly.

It will, of course, be understood that the present detailed description and the accompanying drawings relate to a single preferred executional embodiment of the invention, and that substantial changes may be made in the described construction and arrangement of parts without departing from the spirit and full intended scope of the invention.

Figure 1:
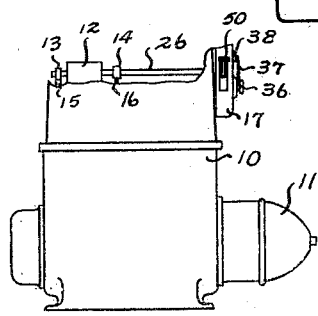
Figures 2, 7:
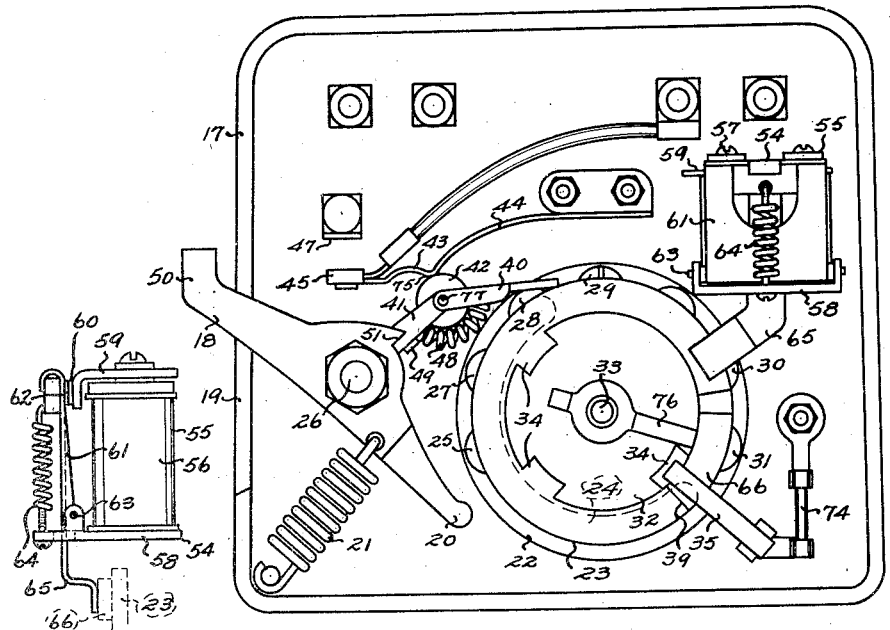
Figure 3:
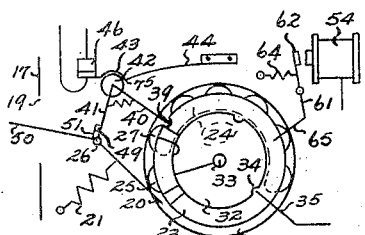
Figure 4:
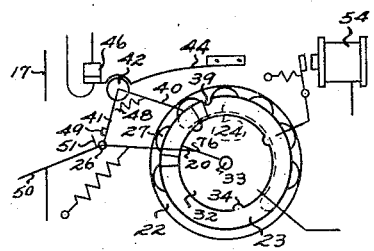
Figure 5:
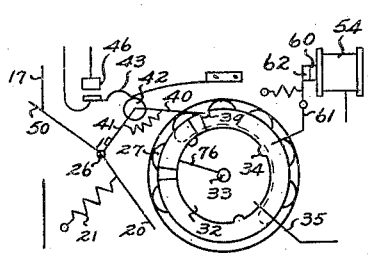
Figure 6:
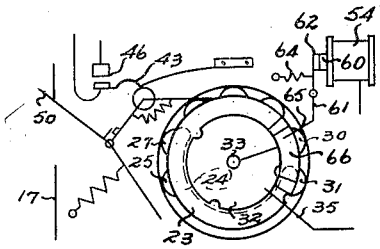

Further objects and advantages will appear from the following detailed description of parts and the accompanying drawings, in which:

Fig. 1 shows diagrammatically an internal combustion engine and dynamo unit, to which a preferred form of the present improvements are applied; Fig. 2 is a front elevation of a preferred form of switch panel board and control mechanism, showing the control mechanism in the "off" position; Fig. 3 indicates, diagrammatically, the positions of various parts of the device, in the "start" position of the switch; Fig. 4 indicates diagrammatically the positions of various parts of the control mechanism, in a succeeding position, in which the engine controls are positioned to start firing, and the ignition circuit closed; Fig. 5 indicates diagrammatically the positions of parts of the control device, in the "high" position, or immediately after the priming lever has been released; Fig. 6 indicates diagrammatically the positions of certain parts of the control means, in the "belt" position, in which the full power of the engine is available for power-driving purposes; Fig. 7 is a side elevation of a preferred form of reverse current relay, showing a detail of the mechanical means for interlocking the relay in the closed position, and Fig. 8 is a diagram showing the various circuit relations of the switch, generator, reverse current cut-out and ignition system, in position to effect starting of the plant.

The device hereinafter described may be used in connection with a power plant assembly, such as is described in detail in a co-pending application of Adolph Rosner, filed December 16, 1927 and bearing Serial No.

240,524. In the copending application, a shaft 26 is operatively associated with a carburetor throttle valve and a priming device, and is arranged, upon partial rotation by means of a lever 50, at time of starting the engine, to set the valve and priming means in the proper positions for starting purposes. In order better to coordinate the operation of the shaft 26 and lever 50 of the above mentioned application with that of the corresponding parts in the present application, the same reference numerals have been preserved.

Referring by numerals to the drawings, 10 represents, generally, an internal combustion engine which, in the present example, is direct-connected to a dynamo 11, (Fig. 1). A control shaft 26 is carried by means of bearings or brackets 12 secured to the engine 10. This shaft is provided with levers 13 and 14 which are arranged to engage members 15 and 16 respectively operatively associated with an engine throttle valve and a priming device, (not shown). Partial rotation of the shaft 26 by means of a manual control lever 50, secured to the shaft 26, adjusts for starting purposes, the carbureting apparatus and the priming means of the engine, in substantially the same manner as rotation of the corresponding shaft described in the above mentioned copending application.

A preferred form of switch panel 17 is shown, (Figs. 1 and 2), attached to a frame portion of the power plant, and this panel serves as an enclosure and support for the mechanism hereinafter described. A portion 18 of the lever 50 extends through and beyond a slotted portion 19 provided in the panel 17, the opposite end of the lever 50 terminating in a nose portion 20. The lever 50 is normally held in contact with a wall portion of the slot 19 by means of a spring 21. A rotary multiple contact switch 22 is mounted on the switch panel, and includes a rotor portion 23 preferably formed of insulating material, and which is provided on the inner side with a metal contacting segment 24, which may be spring pressed (not shown) to impinge upon selected groups of stationary contact terminals 25, 27, 28, 29, 30 and 31. The switch rotor 23 is arranged to rotate with an ignition switch rotor or contact 32, preferably concentric with the member 23. This ignition switch member may be affixed, or carried by the switch rotor 23, or both of the rotors may be disposed on a common shaft 33, so as to render these members rotatable together by a common control. The ignition switch rotor 32 is provided with a plurality of notches or depressions 34, in the present example three such notches being provided. It will, however, be understood that a greater or less number of notches may be used, depending upon the different positions provided for the multiple-contact switch rotor. The notches 34 are adapted to receive a flexible arm 35, which makes contact with, and is adapted to ride upon the surface of rotor 32, except when the flexible arm is brought into register with the notches 34, at which time the ignition circuit is interrupted.

The multiple contact switch may be rotated manually by means of a handle 36 secured to shaft 33, in order selectively to establish the various electrical circuit relations hereinafter appearing. In connection with the handle 36 or affixed thereto, is a pointer 37 shown diagrammatically in Fig. 8, which cooperates with switch position indicators 38, which are preferably fixed at points designated on the front of the switch panel, or on some other exposed surface. The pointer 37 cooperating with the position indicators, provides a visible index of the position of the switch rotor.

The switch rotor 23 is provided with a notch 39 which, when the rotor is rotated to the "start" position, engages a link 40 pivotally connected to an arm 41 which is carried by the shaft 26. A roller 42 is rotatably mounted on a pin 77 which also serves to connect the arm 41 and link 40. Counter-clockwise rotation of the switch rotor 23 (Fig. 2) causes the arm 41, by means of the engagement of the link 40 with the notch 39, to rotate until the roller 42 rides into a depression 43 provided on a resilient member 44 securely attached to the panel 17. The member 44 is provided with a contact member 45 which constitutes a portion of the switch 46, and is adapted to engage a fixed contact 47 to close a battery circuit, as will hereinafter appear. A spring 48 is connected between the link 40 and the arm 41 in order to provide a snap action for opening and closing the switch 46, which as appears consists of contacts 45 and 47. This spring also maintains the link 40 always in contact with the periphery of the rotor 23.

The closing of the switch in the manner above described causes a lug portion 49 on the arm 41 to engage a projection 51 provided on the lever 50. Further counter-clockwise movement of the switch rotor 23, causes the switch 46 to snap into closed position, and produces a partial rotation of the shaft 26 (Fig. 3) for a purpose hereinafter appearing.

Referring particularly to Fig. 8 which is a diagrammatic illustration of the arrangement of the circuits, 11 indicates a dynamo, which may be of any suitable type, and operatively arranged with respect to the engine 10, as shown in Fig. 1. 52 is a secondary battery of any suitable sort, for example a lead and acid type storage battery. An ammeter is provided as shown at 53, to enable observation of the rates of charge and discharge of the storage battery. This ammeter may be located on the switch board 17 along with the other instruments and controls. A reverse current relay 54 includes a current coil 55 preferably of high specific capacity which may be attained by winding this coil of a paper-insulated copper band 56 having substantially the same width as that of the entire spool. A voltage coil 57 of any conventional type is included in the relay. The coils 55 and 57 are, by preference, mounted on a base 58 attached to the panel 17 (Fig. 2) and are interconnected by a member 59 which is provided with a contact 60. An armature member 61 provided with a contact member 62, is pivotally attached to the base 58 by means of a pin 63. A spring 64 is provided to break circuit between the contacts 60 and 62. The armature member 61 is provided with an arm 65 which extends beyond the base 58 and is adapted, at times, to engage a face cam member 66 of insulating material, provided on the switch rotor 23 for a purpose hereinafter appearing.

The dynamo 11 is, by preference, provided with a shunt field 67 and a series field 68. The fields are in such circuit relation with the machine and terminals of the switch 22, as to enable their use separately, or to enable the use of the dynamo as a compound machine. Shunt field resistances 69 may be selectively interposed to provide a control of the charging rate, when the plant is used with secondary batteries. The legs of the line circuit are shown at 70.

A simple and preferred form of ignition circuit is shown in Fig. 8 and comprises a coil 71, timer 72 and a spark plug 73. In the case of multi-cylinder units, a distributor, and several of the spark plugs will be located in the high tension circuit from the coil. A protective fuse 74 may be located in the circuit in order to prevent excessive current from entering the ignition system.

The operation of this device has been rendered entirely automatic except for a simple starting operation, consisting first, in closing switch 23 by manual rotation, and secondly, in depressing the lever 50.

When the plant is to be started, the multiple contact switch 23 is rotated counterclockwise as far as possible to the "start" position. This movement causes the notch 39 on the rotor body 23 to engage the outermost end of link 40, and to move the arm 41 carrying the roller 42. Prior to this movement the spring 48 has been stretched or tensioned, with the result that when the roller passes a projection 75 on the member 44, the roller quickly rides or snaps into the depression 43 by the tension in the flexible member 44, thus snapping the switch 46 into its closed position, and thereby establishing the dynamo circuit through this switch, to cause the dynamo to function as a motor to start cranking the engine. In this position of the multiple contact switch 23 the ignition circuit is open, since the flexible arm 35 is disposed in a notch portion 34 of the rotor (Fig. 3). In the "start" position of the switch, the contacting segment 24 engages terminals 27, 28, 29, 30 and 31, to interconnect portions of the circuit hereinafter described. At this time, the switch 46 is closed as above described, closing the circuit from the battery 52 to the dynamo 11 causing it to function as a motor.

As soon as the plant has been brought up to starting speed on the battery circuit, hand lever 50 is pressed down (Fig. 4). The shaft 26 is thereby partially rotated affecting the carbureting and priming devices of the engine in the same manner as the rotation of the corresponding shaft described in detail in the above mentioned copending application, i. e., the air inlet is choked, and an auxiliary priming fuel injected for starting the engine. The downward movement of the hand lever 50 also causes the end 20 of the lever 50 to engage a projection 76 on the switch rotor 32, thereby rotating rotor 32, rotor 23 and the shaft 33, clockwise, into the "high" position, (Fig. 8). In this position the flexible arm 35 of the ignition switch is caused to ride upon the surface of the rotor 32, and to close the ignition circuit, and causing the engine to start firing. In the "high" position, the contacting segment 24 engages terminals 28, 29, 30 and 31. Shunt field resistances 69 are shorted out when the rotor is in this position, and the dynamo functions as a shunt wound generator. The current may be used for ignition or line, as well as for the purpose of charging the battery.

As long as the plant is being supplied with battery current through the closed switch 46, i. e., when the dynamo 11 is operating as a motor, the relay 54 remains open. This relay operates according to a known principle of reverse-current relays, so that when the battery current flows backward or opposite to its normal direction through the current coil 55, the magnetic flux induced by the latter opposes the flux induced by the voltage coil 57, the latter coil never changing polarity. During reversal of the current, the fluxes of the two coils therefore oppose each other to such an extent that the spring 64 is able to withdraw the armature 61, to open this leg of the circuit. During the motoring period, the relay 54 therefore remains open because of insufficient energization of the voltage coil 57. It will be apparent that the current from the battery is flowing through the series coil 55, on which a negligibly small effect is being produced, and thence through the voltage coil 57 in a direction such as would close the relay if the voltage were high enough. But in the present example, the battery does not produce sufficient voltage while motoring the dynamo to have any effect on the relay. In Fig. 4 the switch 46 is still closed and the plant is being motored on the battery; the ignition circuit being closed and the engine approaching running speed. As the speed of the engine increases, the generator voltage builds up which in turn reverses the direction of current and charges the battery through the closed switch 46. It will be apparent that when the voltage builds up in the charging circuit, the relay 54 is closed, and that this closure is prior to the opening of the switch 46.

In Fig. 5 hand lever 50 is shown as having been released, and being returned under the influence of the spring 21. The projection 51 on the lever 50 impinges upon the lug 49 on the arm 41 and rotates this arm clockwise to withdraw the roller 42 from the depression 43 to break contact between parts of the switch 46. This return movement of lever 50 results in a corresponding rotation of the shaft 26, which serves to place all the engine fuel controls in their normal operating position, as described in the above copending application, and the dynamo continues to be driven by the engine, and the switch mechanism may remain in the "high" position, with the parts appearing as in Fig. 5. It will be apparent that when the switch 46 is opened, as above described, the full generator voltage is applied to the voltage coil 57, and as all other load on the generator has been dropped, the generator voltage rises to a value sufficient to enable the voltage coil to close the relay 54. When this occurs, the contacts 60 and 62 of the relay re-establish connection with the battery into which a considerable current flows from the generator and through the series coil. The powerful effect of the series coil is added to that of the voltage coil and positive closure of the relay assured.

In the "low" position of the switch 23, not specifically illustrated in the drawings, the contacting segment 24 engages terminals 29, 30 and 31. The ignition circuit and relay 54 remain closed, and the dynamo still functions as a generator. Shunt field resistance 69 is now in series with the shunt field 67 of the dynamo, thus greatly reducing the terminal voltage and providing a moderate rate of charging. It will appear (Figs. 2 and 8), that the terminal 29 is divided, with one part connected into the shunt field resistance 69, and with the other part constituting an end terminal of this resistance. It is preferred that, with the switch in the "low" position, the segment 24 engages only the latter portion of the terminal, so that the full resistance may be interposed.

In the "stop" position of the switch 23, (not specifically shown), the contacting segment 24 engages only the terminals 30 and 31. The engine is inoperative because the ignition switch rotor 32 has been so rotated that one of the notches 34 falls opposite the contact arm 35, and opened the ignition circuit. Current is available from the battery to the line, through contact 30, segment 24 and contact 31.

When it is desired to employ the greater part of the engine power for mechanical driving purposes, the switch is placed in the "belt" position (not specifically appearing) in which the contacting segment engages terminals 25, 30 and 31. The battery supplies the ignition and line current, and the engine has the greater part of its power available for delivery at the pulley. It will appear from Fig. 8 that in the "belt" position of the switch, the series and shunt fields are both in circuit, but the latter is connected through the entire resistance 69. In this switch position, the generator output may, at times, be insufficient to keep the relay closed, due to the pulley load, but it is of course essential to keep the relay closed in order to supply ignition current for the engine. To care for this requirement, the cam 66 provided on the switch member 23, engages the arm 65 of the relay to prevent the contacts 60 and 62 from separating. This mechanical expedient is independent of any electromagnetic function of the relay coils.

In Fig. 6, or in the "line" position of the switch elements, the contacting segment has been rotated to a position where it engages terminals 25, 27 and 31. The ignition circuit is kept closed mechanically by the impingement of arm 65 of the relay 54, upon the cam 66. The dynamo functions as a compound generator to maintain a constant line voltage of substantial value, since the fields 67 and 68 are both fully effective, the resistance 69 having been shorted by bridging contacts 25 and 27. This current is used directly for ignition and line load, as the battery circuit is open, being, in this situation, incomplete between contacts 30 and 31.

In the "off" position of the switch, all circuits are open, since the segment 24 engages only terminals 25, 27 and 28, being thus ineffective to close any of the individual battery-generator circuits. The ignition circuit is also open, since in this switch position, the arm 35 registers with one of the notches 34.

The particular construction of the switch, and the arrangement of the switch terminals, in the described example, provide for extreme simplification of the various circuits, and result in a simple switching mechanism which is particularly adapted for power plant use in connection with a mechanical fuel control arrangement and with the automatic reverse current cut-out.

Obviously, many features of the switch mechanism, terminals, connections, circuits, reverse current relay, as well as the manual starting control means, may be varied substantially without departure from the scope and full intendment of this invention.

I claim as my invention:

1. In a dynamo electric power plant employing a secondary battery, a switch having a rotary contact disc, for selectively effecting a plurality of circuit relations between the battery and plant, a reverse-current relay in circuit with the battery, and mechanical means for actuating the relay responsively to a predetermined position of the contact disc, said means including a cam carried by the disc, and a lever in operative relation to the relay, and disposed in the path of movement of said cam.

2. In a power plant including an engine, a dynamo and battery, a selector switch adapted for establishing various predetermined circuit relations between the battery and dynamo, a starting switch, a manual control lever associated with the starting switch, a manual control member for said selector switch, and means, including said control member, for operatively relating said starting switch lever and said selector switch, an electromagnetic switching means associated with the selector switch and in circuit relation between the dynamo and battery.

3. In a power plant including an engine, a dynamo and battery, a selector switch and associated conductors arranged for selectively establishing each of a plurality of circuits between the dynamo and battery, a reverse current relay in circuit relation with the battery and dynamo, a starting switch, distinct from the selector switch, for closing a circuit between said battery and dynamo, a manual control element, and means including said selector switch, permitting the starting switch to be opened and circuit relation to be established through the relay, responsive to a movement of said manual control element.

4. In a power plant including an engine, a dynamo and a battery, a selector switch arranged for establishing various predetermined circuit relations between the dynamo and battery, a starting switch distinct from the selector switch, and having a manual operating element, means operatively relating said element and selector switch in certain positions of the selector switch, a reverse current relay, and means including portions of the selector switch for normally maintaining said relay and starting switch in relatively opposite switch positions.

5. In a power plant including an engine, a dynamo and a battery, a selector switch arranged to effect predetermined circuit relations between the dynamo and battery, a starting switch, a manual control lever therefor having an operative and an inoperative position and adapted upon movement to operative position to actuate said selector switch, an electro-magnetically operated switch, and means whereby said last named switch is mechanically kept in closed position when said manual control lever is in its inoperative position.

6. In a power plant including an engine, a dynamo and a battery, an electro-magnetic switch adapted for controlling the direction of current between the dynamo and battery, control means disposed for rotation about a common axis, said means including a selector switch member adapted upon rotation to establish predetermined circuit relations between the dynamo and battery, a rotatable ignition switch member, and a cam adapted in certain positions of said rotatable means mechanically to position said electro-magnetic switch.

7. In a power plant including an engine, a dynamo and a battery, a switch having a rotatable contact disc, and associated fixed contacts for selectively establishing predetermined circuit relations between the dynamo and battery, a reverse current relay in the dynamo-battery circuit, and a cam carried by said rotatable disc, adapted to actuate said relay, in predetermined positions of said disc.

8. In a power plant including an engine, a dynamo and a battery, a multiple contact switch arranged for establishing predetermined circuit relations between the dynamo and battery, said switch including a rotary contact member; a reverse current relay, a shaft arranged for control of the fuel system of the engine, and means for selectively causing said fuel control shaft to actuate said rotary contact member, when said member is in certain positions, and means for actuating the reverse current relay to open and close a circuit therethrough, by movement of the contact member, in certain other positions of said member.

9. In a power plant including an engine, a dynamo and a battery, a selector switch arranged for establishing predetermined circuit relations between the dynamo and battery, a starting switch separate from the selector switch, said selector switch being adapted for operation to establish a circuit between said battery and dynamo through both of said switches, and a manual control member adapted normally to maintain said starting switch in inoperative position.

10. In combination with a power plant including an engine, dynamo and battery, a control panel, a selector switch including a rotary element and fixed contacts adjacent the panel, a starting switch including a toggle operating mechanism having one leg disposed for operative engagement by the selector switch rotor, an engine fuel-control shaft extending beyond the panel and rotatably carrying another leg of the toggle mechanism, and a manual control element associated with said fuel control shaft and having a lost motion connection with one arm of said toggle mechanism.

11. In a control device for a power plant including an engine, dynamo and battery controls for the engine, a control shaft arranged to be manually positioned to adjust the engine controls for starting, a manual control member carried by said shaft, and adapted for limited partial rotation between operative and inoperative positions, a selector switch in circuit relation between the dynamo and battery and adapted to be actuated by said manual control member when said member is in an operative position, a starting switch distinct from the selector switch, a switch-actuating device arranged to move the starting switch into closed position, upon a predetermined movement of the selector switch, said actuating device being operatively associated with said manual control element for movement toward switch opening position, as said control member is moved from operative to inoperative position.

12. In combination in a power plant including an engine, dynamo and battery, a control panelboard, an engine fuel control shaft extending beyond the panelboard and adapted to effect an engine fuel control during the starting period, a manual control member carried by said shaft adjacent the panelboard, a starting switch including a toggle switch-operating mechanism having one leg rotatably carried by said shaft, a multiple contact selector switch including fixed contacts carried by the panelboard, a switch rotor having a contact segment rotatable into selective engagement with said fixed contacts, said rotor, in certain switch positions, being operatively associated with one leg of the toggle mechanism of said starting switch, an ignition switch including a rotatable member associated with the selector switch rotor, a reverse current relay carried by the panelboard and means for mechanically actuating said relay in certain positions of the selector switch, said means including an actuating arm extending from the relay and a face cam carried by the selector switch rotor, and adapted in certain positions thereof to engage said arm for mechanically maintaining the relay in closed position independently of its eelctrical energization.

WILLIAM H. HARSTICK.